(12) United States Patent
Hodara

(10) Patent No.: US 10,118,680 B2
(45) Date of Patent: Nov. 6, 2018

(54) METHOD OF MANUFACTURING A GARMENT EQUIPPED WITH LUMENS CONFIGURED TO HOLD AIR

(71) Applicant: Alberto Cesar Hodara, Potro Alegre-Rio Grande do Sul (BR)

(72) Inventor: Alberto Cesar Hodara, Potro Alegre-Rio Grande do Sul (BR)

( * ) Notice: Subject to any disclaimer, the term of this patent is extended or adjusted under 35 U.S.C. 154(b) by 401 days.

(21) Appl. No.: 14/850,998

(22) Filed: Sep. 11, 2015

(65) Prior Publication Data

US 2015/0375839 A1 Dec. 31, 2015

Related U.S. Application Data

(63) Continuation of application No. PCT/BR2013/000533, filed on Dec. 2, 2013.

(51) Int. Cl.
*A63B 39/00* (2006.01)
*A63B 41/00* (2006.01)
(Continued)

(52) U.S. Cl.
CPC ............... *B63C 9/20* (2013.01); *A41D 7/003* (2013.01); *B29C 65/48* (2013.01); *B29C 65/4805* (2013.01); *B29C 66/026* (2013.01); *B29C 66/1122* (2013.01); *B29C 66/43* (2013.01); *B29C 66/71* (2013.01); *B29C 66/7292* (2013.01); *B63C 9/1255* (2013.01);
(Continued)

(58) Field of Classification Search
CPC ....... B63C 9/125; B63C 9/1255; B63C 9/105; B63C 9/1055; B63C 11/08; B63C 2011/085; B29C 65/482; B29C 65/48; B29C 66/43; B29C 66/432; B29C 66/4326; B29C 66/439; B29C 66/496; B29C 66/71; B29C 66/026; B29C 66/02245; A41D 13/0125
USPC ... 156/60, 90, 145, 146, 147, 153, 156, 278, 156/285, 287, 190, 291, 292, 297, 313, 156/314, 316, 338; 2/2.15, 2.16, 2.17, 2/102; 405/186; 441/88, 90, 102, 103, 441/106, 108, 114, 115, 116, 117, 118
See application file for complete search history.

(56) References Cited

U.S. PATENT DOCUMENTS

| 2,869,133 A | 1/1959 | Garbellano |
| 3,323,959 A | 6/1967 | Alois |

(Continued)

FOREIGN PATENT DOCUMENTS

| BE | 422303 A | 7/1937 | |
| FR | 2620416 A1 * | 3/1989 | ........... B63C 9/1055 |

(Continued)

OTHER PUBLICATIONS

International Search Report and Written Opinion dated Feb. 19, 2014 in connection with International Application PCT/BR2013/000533.

(Continued)

*Primary Examiner* — Philip C Tucker
*Assistant Examiner* — Brian R Slawski
(74) *Attorney, Agent, or Firm* — Corridor Law Group, P.C.

(57) ABSTRACT

A garment for the practice of water sports includes lumens for containing air. The garment is made of two superimposed neoprene sheets forming one or more lumens limited on their periphery by winding or angled welding lines.

7 Claims, 5 Drawing Sheets

(51) Int. Cl.
*B29C 65/00* (2006.01)
*B32B 37/00* (2006.01)
*B32B 38/10* (2006.01)
*C09J 5/04* (2006.01)
*C09J 4/00* (2006.01)
*C09J 101/00* (2006.01)
*C09J 201/00* (2006.01)
*A41D 1/04* (2006.01)
*B63C 11/04* (2006.01)
*B63C 11/10* (2006.01)
*B63C 9/08* (2006.01)
*B63C 9/20* (2006.01)
*B29C 65/48* (2006.01)
*B63C 9/125* (2006.01)
*A41D 7/00* (2006.01)
*B29L 22/02* (2006.01)
*B29L 31/52* (2006.01)

(52) U.S. Cl.
CPC ......... *B29C 66/133* (2013.01); *B29L 2022/02* (2013.01); *B29L 2031/5254* (2013.01); *Y10T 156/10* (2015.01)

(56) References Cited

U.S. PATENT DOCUMENTS

| | | | |
|---|---|---|---|
| 3,675,244 A * | 7/1972 | Mayo | B63C 11/04 |
| | | | 2/2.16 |
| 5,682,613 A | 11/1997 | Dinatale | |
| 6,519,774 B2 | 2/2003 | Mitchell | |
| 6,976,894 B1 | 12/2005 | Turner | |
| 7,150,668 B2 | 12/2006 | Kemp | |
| 2005/0042956 A1 | 2/2005 | Hodara | |
| 2006/0174392 A1 | 8/2006 | Farnworth et al. | |
| 2007/0006356 A1 * | 1/2007 | Shiue | A41D 31/0038 |
| | | | 2/2.15 |

FOREIGN PATENT DOCUMENTS

| | | | |
|---|---|---|---|
| FR | 2731592 A1 * | 9/1996 | A41D 13/012 |
| FR | 2789651 A1 | 2/1999 | |

OTHER PUBLICATIONS

Office Action dated Oct. 10, 2014 in connection with U.S. Appl. No. 13/856,616.

* cited by examiner

METHOD OF MANUFACTURING A GARMENT EQUIPPED WITH LUMENS CONFIGURED TO HOLD AIR

CROSS-REFERENCE TO RELATED APPLICATION

This application is a continuation of International Application No. PCT/BR2013/000533 having a filing date of Dec. 2, 2013, entitled "Garment for Practicing Water Sports with Air-Filled Cavities and Method for Welding the Edges of Said Cavities", which is related to and claims priority benefits from Brazilian patent application No. BR20121031058 20121206 filed on Dec. 6, 2012. This application also claims foreign priority benefits from the '206 Brazilian application. International Application No. PCT/BR2013/000533 application is hereby incorporated by reference herein in its entirety.

FIELD OF THE INVENTION

The present invention relates to a garment for practicing water sports fitted with lumens configured to hold air. The disclosure also relates to a method of welding the periphery of the lumens through winding or angled welding lines. In at least some embodiments, the method maintains elasticity of the garment allowing for greater movement of the wear. The method inhibits the formation of rigid areas that often appear when straight bonding techniques are used.

BACKGROUND OF THE INVENTION

Aquatic garments are often made of neoprene (also known as polychloroprene), a high-strength elastomeric material. Neoprene is often used to provide thermal comfort to the wearer. However, such existing aquatic garments do not provide means to aid in a wearer's survival in the case of long-term underwater submersion. In addition, such garments do not aid in flotation.

Existing aquatic garments do little to reduce the likelihood of death by those participating in watersports, such as surfers. In particular, existing aquatic garments do not provide means to keep a wearer afloat which is desirable if the wearer tires or become unconscious. There have been several attempts to create aquatic garment designs that would reduce the likelihood of death for those participating in watersports. Some of these designs are disclosed in Brazilian patent publication No. PI9600469; Brazilian patent publication No. 0102839; Belgian patent publication No. 422303; U.S. Pat. No. 6,976,894; and U.S. patent application publication No. 2006/174392.

Brazilian Patent No. 0104789, the application for which was also filed by the applicant of the present application, describes a life-saving garment made of a waterproof material provided with a number of lumens or compartments positioned close to the neck, along the front and rear areas. These compartments keep the lumens inflated in order to keep the wearer's head and nose out of the water, thereby avoiding death by drowning in case of unconsciousness.

Prior designs typically include an elastic surface where the conformation of the inflatable lumens is achieved by bonding together two superimposed sheets of fabric material with impermeable properties such as neoprene. However, bonding the material in a straight line or bonding long straight segments generates an area without elasticity, which limits the wearer's range of motion, particularly in the shoulder region. This bonding method can also allow air leakage between the clothing fibers if not accurately performed.

SUMMARY OF THE INVENTION

A method of welding together the periphery of the lumens along winding or angled lines creates a barrier to the dissipation of air between the garment's fibers. Additionally, this method aids in maintaining the elasticity of material and the range of wearer's motion and inhibits the formation of rigid areas that occur when the straight-line techniques are employed.

In some embodiments of the method, lumens are welded or fused together along the periphery using winding or angled lines. The lumens can have a layer of elastomeric adhesive applied to them. In certain embodiments, the periphery of the lumens undergo a chemical reaction in a previously delimited area through the application of a chemical, such as an acid. In other or the same embodiments, the winding or angled lines describe a line of welding where the neoprene's lining is removed and a minimum of one layer of an adhesive product is applied.

In the present method, the welding together of the inflatable lumens along winding or angled lines produces a spring-like effect, providing elasticity to the aquatic garments so equipped such that the wearer's range of motion is improved over that of existing aquatic garments.

DETAIL DESCRIPTION OF ILLUSTRATIVE EMBODIMENT(S)

Garment 100 is fitted with lumens 10 which are configured to hold air. Garment 100 can be used for watersports.

In at least some embodiments, garment 100 is made of neoprene. In at least one embodiment garment 100 is made of an elastomer made of polychloroprene rubber lined with nylon fabric on both sides. This material has imperviousness, isothermal, and resiliency properties.

Figure 4:
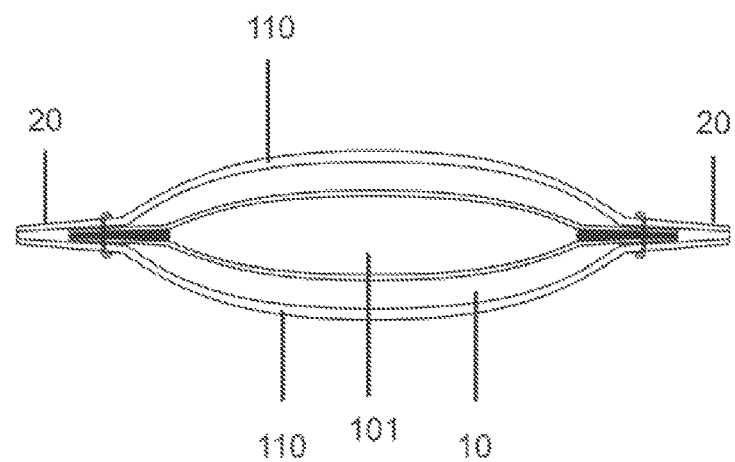
FIG. 4 illustrates the inclusion of a resilient material chamber located in the inner region of a lumen.

Suit 100 contains an arrangement of lumens 10 which are created by welding together two superimposed sheets of material 110 (See FIG. 4). In some embodiments the material is neoprene. In some embodiments lumens 10 are welded along the periphery by winding or angled welding lines 20. Winding or angled welding lines 20 avoid, or at least reduce, the formation of inelastic areas that would impede a wear's movement as can occur when welding is performed in a straight line.

Among other places, lumens 10 can be placed in the chest area, close to the neck, and/or in the dorsal or lumbar area.

Winding and/or angled welding lines 20 eliminate, or at least reduce, the presence of extensive straight lines that can cause inelastic areas that hamper the user's full range of motion. Alternatively, winding and/or angled welding lines 20 can create a spring effect. This spring effect can be particularly useful in the shoulder area where intense motion such as flexing, extension, abduction, hyperextension, adduction and internal rotation is often desired for rowing and swimming.

Figure 5:
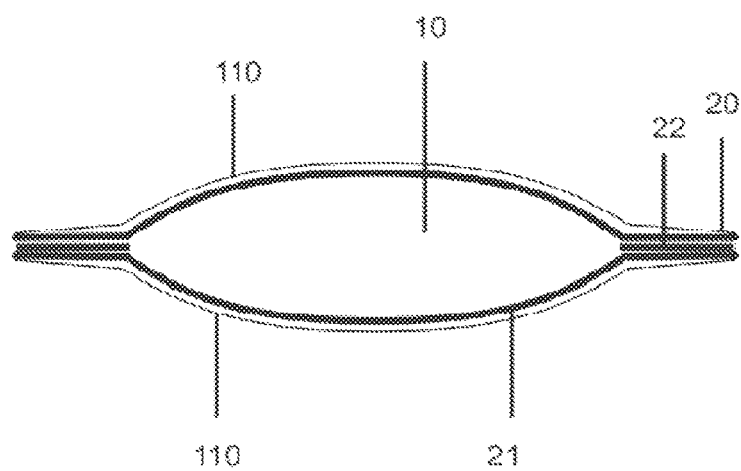
FIG. 5 illustrates a lumen with a coating applied to the inner wall in order to inhibit air permeability.
Figure 6A:
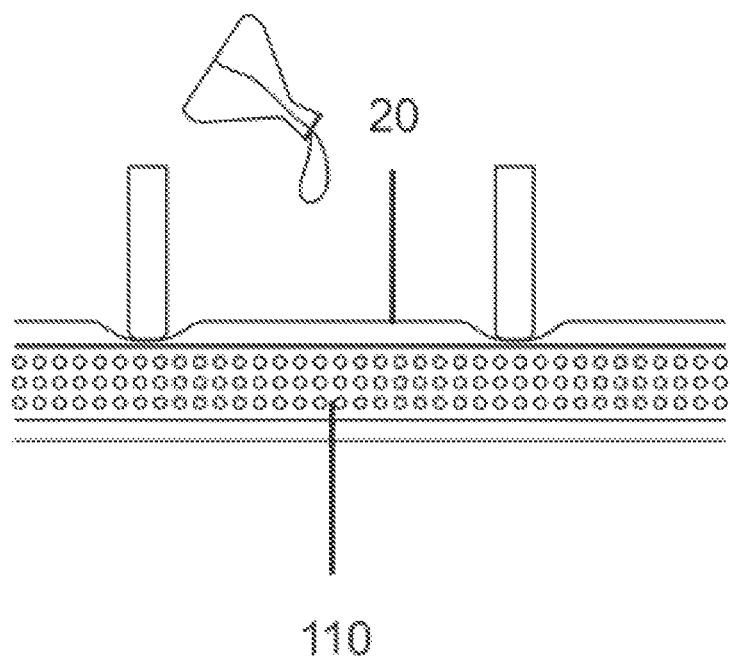
FIG. 6A illustrates a process of welding or fusing the periphery of a lumen though a chemical reaction, showing how the welding line is delimited.
Figure 6B:
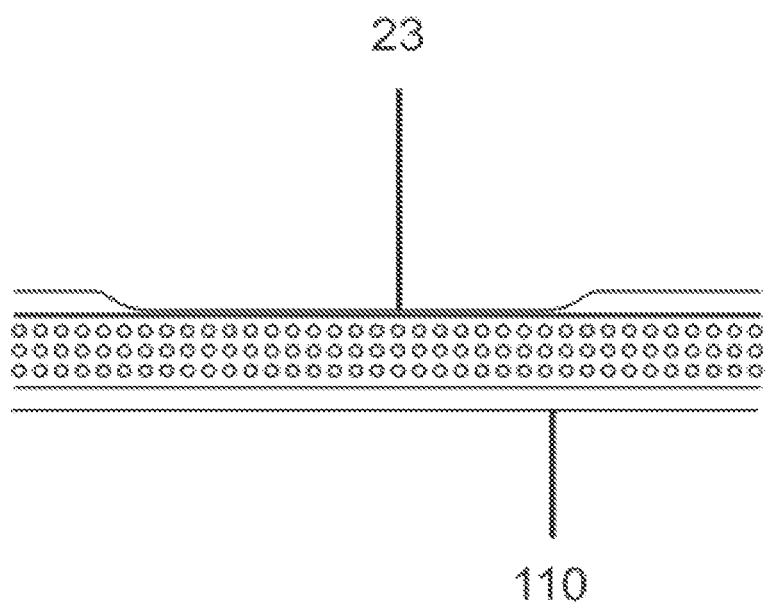
FIG. 6B shows the placement of the garment coating after a chemical reaction.
Figure 6C:
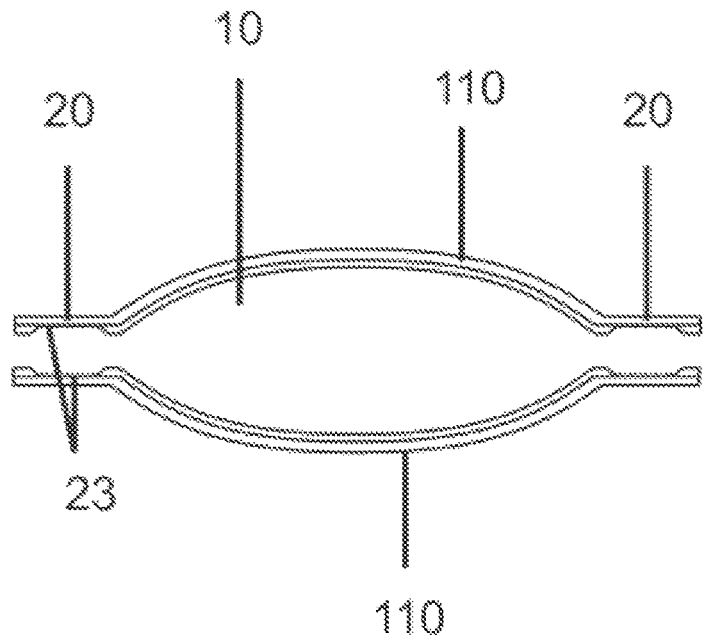
FIG. 6C shows the inner face of the applied bonding line.
Figure 6D:
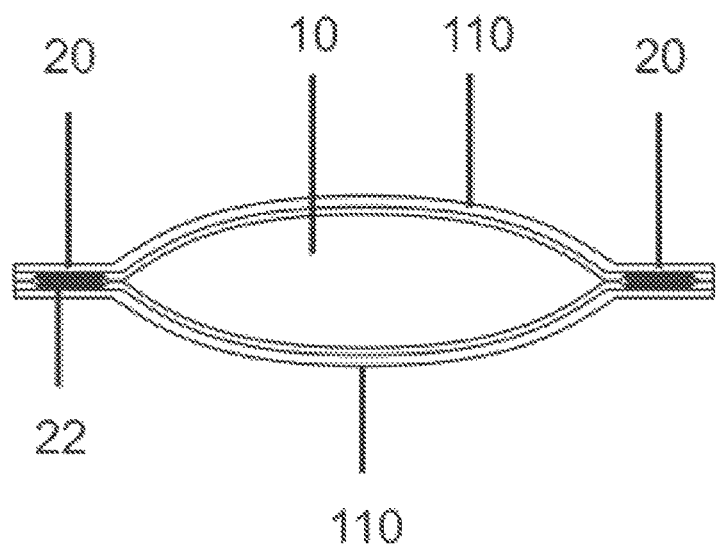
FIG. 6D shows the formation of the lumen by superimposing two sheets of fabric. It also shows the face collapsed or indented by a chemical reaction and the welding achieved by the adhesive.

In some embodiments lumen 10 has air chamber 101 made of an elastic material (see FIG. 4). Chamber 101 can have coating 21 applied to its inner surface. In some embodiments coating 21 is a paint. In certain embodiments coating 21 is applied by a silk-screen method. Coating 21 can act as physical barrier to the leakage of the air contained in lumen 10 through the fabric fibers (see FIG. 5).

In some embodiments lumen 10 or chamber 101 are filled with air by means of bidirectional bite valve 11. In at least some embodiments bidirectional bite valve 11 is located on the front of garment 100 such that valve 11 can be readily access by the wearer of garment 100. In certain embodiments a user can use bidirectional bite valve 11 to access the air stored in lumens 10 and/or chambers 101.

Figure 1:
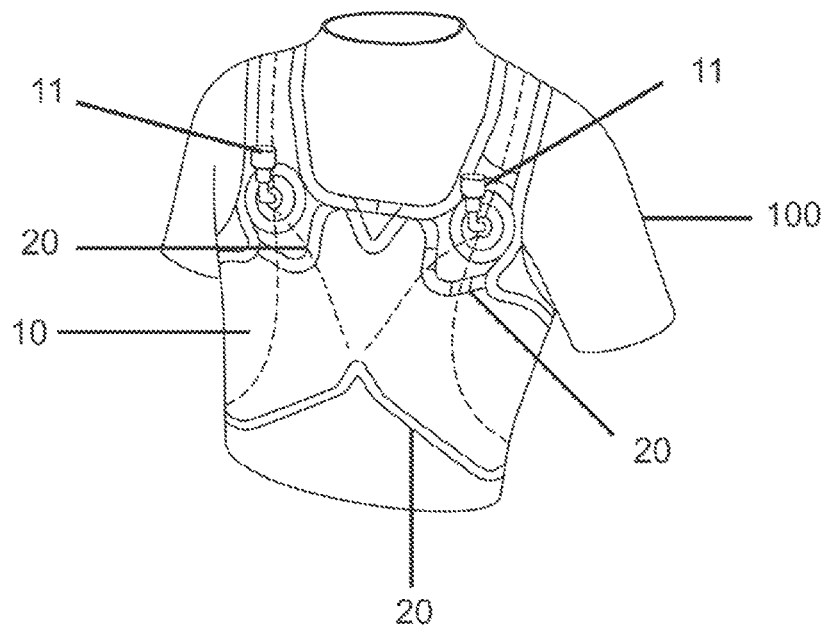
FIG. 1 is a front perspective view of an aquatic garment, highlighting the winding and/or angled welding lines along the periphery of the inflatable lumens. The dashed lines indicate the path made by the profiles or surfaces incorporated in the inner region of the lumens to facilitate the passage of air towards the valve.
Figure 2:
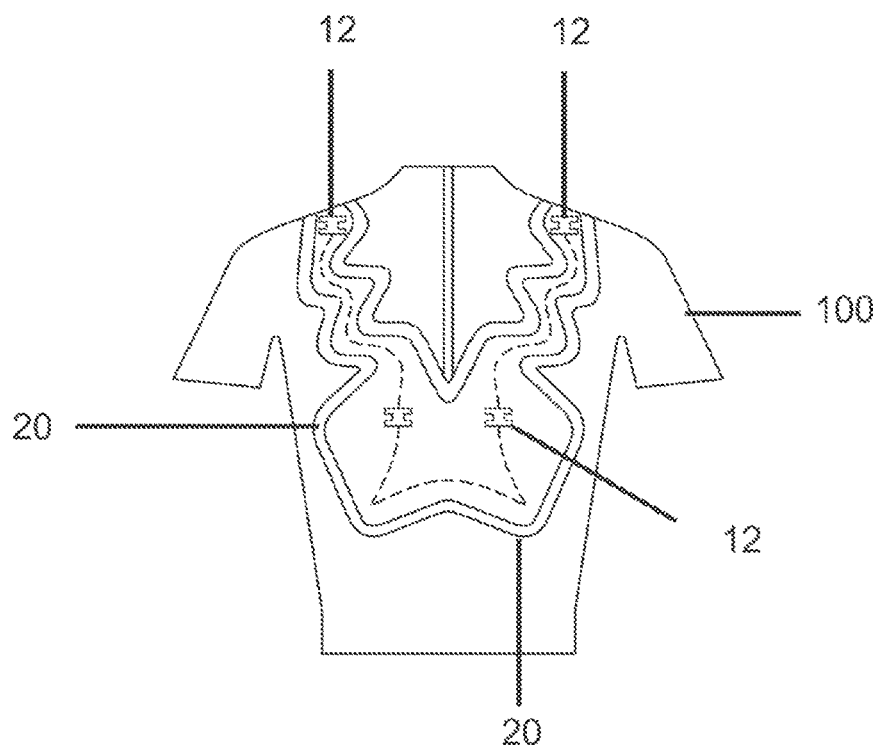
FIG. 2 is a back view of a garment, highlighting the profiles arranged in the inner region of the lumens and the path (represented by the dashed lines) made by the profiles when the air is introduced via the valve.
Figure 3:
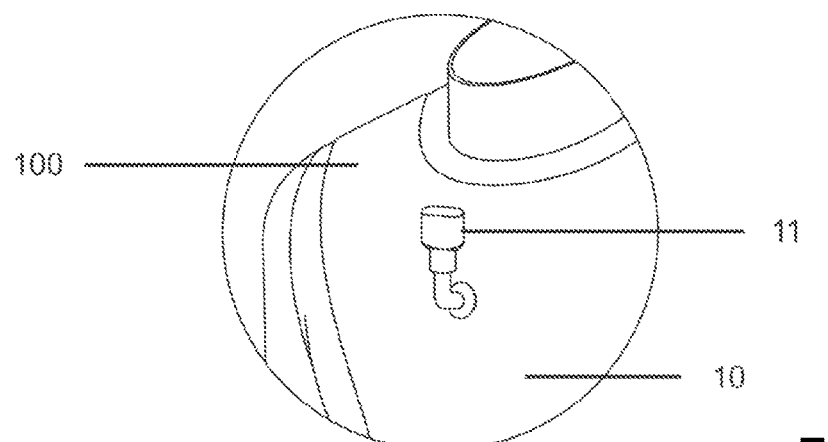
FIG. 3 is a close-up of the bidirectional bite valve shown in FIG. 1 for filling the lumen(s) and/or for complementary oxygenation.

In some embodiments in the inner region of lumen 10 there are profiles 12 which move according to the flow of air created by the aspiration of bidirectional bite valve 11. Profiles 12, which can comprise internal protrusions, can facilitate the passing of air whether lumen 10 is being filled or emptied. Profiles 12 are especially useful in areas of constraint, where the elasticity of the material can cause a restriction of the intake or exhaust of air, as seen in FIGS. 1 and 2.

In certain embodiments, as lumens 10 are filled with air, they work to keep the wear's chest elevated. Lumens positioned in this location can decrease the effort of rowing in the case of surfing. Lumens 10 also aid in the wearer's flotation. In particular, in at least some embodiments, the shape, volume and/or location of lumens 10 aid in keeping a wear's head above the water. In the same or other embodiments, lumens 10 can provide supplementary oxygenation that can be accessed via bidirectional bite valve 11.

The welding method employed for line 20 of lumen 10 is delimited by flaps to cause the chemical reaction for the inner surface of the fabric through the application of an acid, such as hydrochloric acid, collapsing the neoprene's lining 110 and configuring an area where the thickness is reduced and pores 23 are eliminated, or at least reduced, thereby providing a chemical barrier that stops or inhibits the air contained in inflatable chamber 10 from escaping. Indented or collapsed area 23 of welding line 20 receives the adhesive 22, or the like, for bonding, as described in FIGS. 6A, 6B, 6C and 6D.

Figure 7:
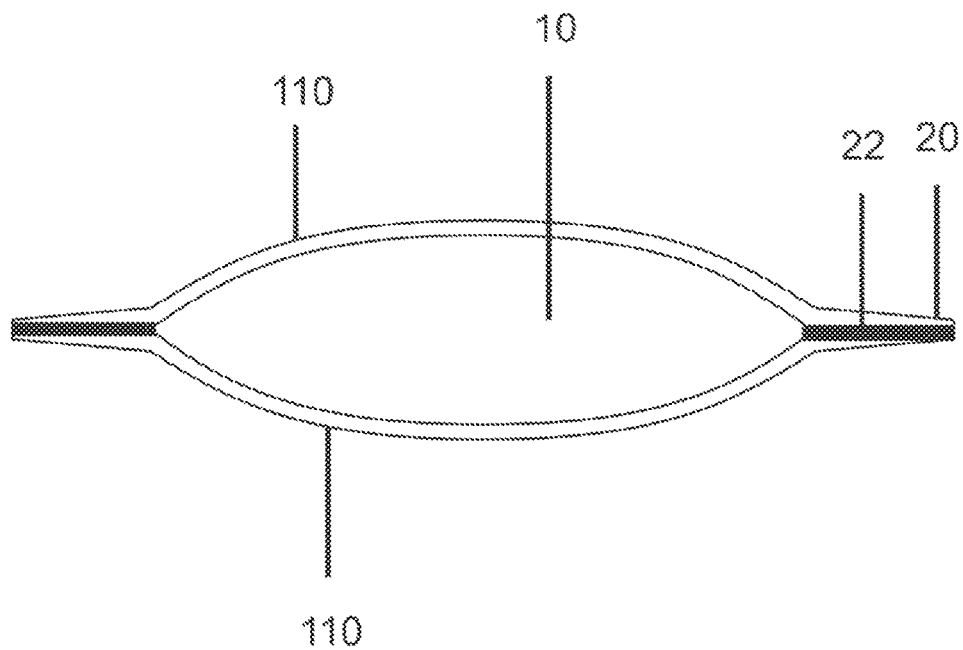
FIG. 7 shows a representation of the welding of the periphery of the lumen and the application of the elastomeric adhesive.

Optionally, the welding method can be achieved by superposing the neoprene sheets 110 or the like, with at least one coat of elastomeric adhesive 22 being applied onto the inner surface of welding line 20 of lumen 10, in such a way as to constitute a mechanical barrier to stop or inhibit the air from permeating through the fabric fibers, as shown in FIG. 7.

Figure 8:
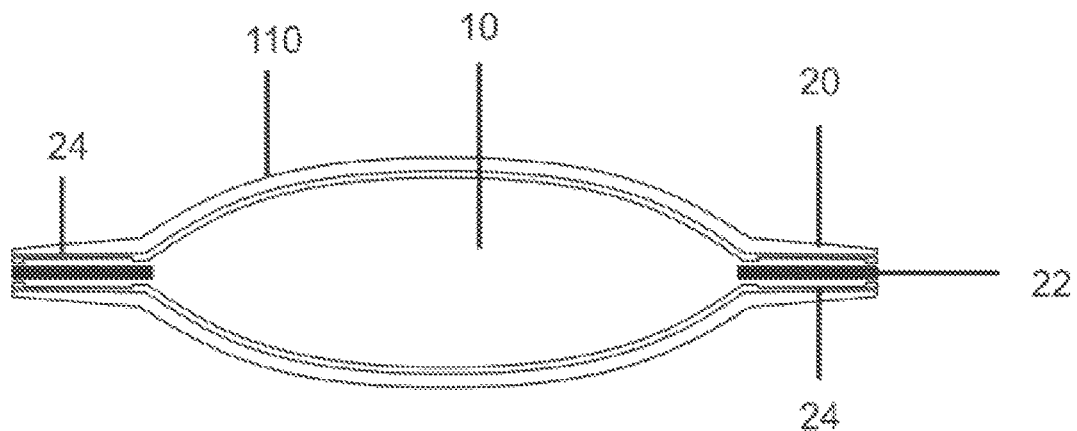
FIG. 8 shows the representation of the welding line of the lumen and the shape of a trench formed therein.

Optionally, the welding method can be accomplished by deepening trench 24 along welding line 20 of lumen 24 by removing the inner coating of neoprene sheet 110, in such a way as to eliminate, or at least reduce, areas with fibers that allow permeation of air. At least one coat of adhesive 22 or the like is applied into trench 24 to prevent, or at least inhibit, air leakage, and welding line 20 is bonded to opposite sheet 100 by means of adhesive 22, as depicted in FIG. 8.

While particular elements, embodiments and applications of the present invention have been shown and described, it will be understood, that the invention is not limited thereto since modifications can be made by those skilled in the art without departing from the scope of the present disclosure, particularly in light of the foregoing teachings. For example, the numerous embodiments demonstrate that different combinations of components are possible within the scope of the claimed invention, and these described embodiments are demonstrative and other combinations of the same or similar components can be employed to achieve substantially the same result in substantially the same way.

What is claimed is:

1. A method of welding a periphery of a lumen applied to garment, the method comprising:
   (a) superimposing a first sheet of neoprene and a second sheet of neoprene with a layer of an elastomeric adhesive, wherein a chemical reaction of a previously delimited area occurs through the application of an acid.

2. The method of claim 1, wherein a trench is made along a welding line by removing a lining of neoprene into which a layer of adhesive product is applied.

3. The method of claim 1, wherein an air chamber made of an elastic material is formed inside an internal region of said lumen.

4. The method of claim 1, wherein said lumen is positioned next to a profile located in an internal region of said lumen.

5. A method of welding a periphery of a lumen applied to garment, the method comprising:
   (a) superimposing a first sheet of neoprene and a second sheet of neoprene with a layer of an elastomeric adhesive, wherein a trench is made along a welding line by removing a lining of neoprene into which a layer of adhesive product is applied.

6. The method of claim 5, wherein an air chamber made of an elastic material is formed inside an internal region of said lumen.

7. The method of claim 5, wherein said lumen is positioned next to a profile located in an internal region of said lumen.

* * * * *